United States Patent
Place et al.

(10) Patent No.: US 7,252,025 B2
(45) Date of Patent: Aug. 7, 2007

(54) SWIVEL HEAD MODULE FOR A CLAMSHELL LATHE

(75) Inventors: Brent Place, Hager City, WI (US); Donato L. Ricci, Hager City, WI (US)

(73) Assignee: D. L. Ricci Corp., Red Wing, MN (US)

(*) Notice: Subject to any disclaimer, the term of this patent is extended or adjusted under 35 U.S.C. 154(b) by 324 days.

(21) Appl. No.: 11/081,474

(22) Filed: Mar. 16, 2005

(65) Prior Publication Data

US 2006/0207395 A1   Sep. 21, 2006

(51) Int. Cl.
*B23B 3/22* (2006.01)
*B23Q 1/40* (2006.01)

(52) U.S. Cl. .......................... 82/113; 82/101
(58) Field of Classification Search .......... 82/113, 82/101, 128, 131; 30/95, 97
See application file for complete search history.

(56) References Cited

U.S. PATENT DOCUMENTS

| | | | |
|---|---|---|---|
| 4,739,685 A | 4/1988 | Ricci | 82/4 |
| 4,746,395 A * | 5/1988 | Lampe et al. | 156/524 |
| 4,939,964 A | 7/1990 | Ricci | 82/113 |
| 5,394,776 A * | 3/1995 | Robinson | 82/113 |
| 5,549,024 A * | 8/1996 | Ricci | 82/113 |
| 6,257,110 B1 * | 7/2001 | Ricci et al. | 82/113 |
| 6,427,567 B1 | 8/2002 | Ricci et al. | 82/113 |
| D466,132 S | 11/2002 | Ricci et al. | D15/1 |
| 6,619,164 B1 | 9/2003 | Ricci et al. | 82/113 |
| 6,641,345 B2 * | 11/2003 | Cobene et al. | 412/1 |
| 6,966,731 B2 * | 11/2005 | VanderPol et al. | 409/179 |

* cited by examiner

*Primary Examiner*—Willmon Fridie, Jr.
(74) *Attorney, Agent, or Firm*—Quarles & Brady LLP (57) ABSTRACT

A swivel head assembly for a clamshell lathe is provided. The swivel head module includes an adjustable tool head assembly. The adjustable tool head assembly has a tool for machining a work piece, and is capable of being incrementally advanced in a radial direction against the work piece. The swivel head assembly further includes a means for positioning the metal working tool along an x-axis, y-axis, and z-axis. A tripper assembly is operatively coupled to the tool head assembly to incrementally urge the tool head against the work piece upon each revolution of the clamshell ring. The tripper assembly incorporates a solenoid for selectively incrementally advancing the tool against the work piece.

14 Claims, 6 Drawing Sheets

SWIVEL HEAD MODULE FOR A CLAMSHELL LATHE

BACKGROUND OF THE INVENTION

1. Field of the Invention

This invention relates generally to a clamshell lathe, and in particular to a mechanism for cutting, beveling, facing and boring the wall of a large diameter work piece.

2. Description of the Related Art

Clamshell lathes are known in the art. A clamshell lathe generally has a first and second semi-circular segment. The semi-circulars segments are clamped together to form an annular assembly encircling a work piece to be machined. The annular assembly includes a stationary ring, and a rotatable ring abutting the stationary ring. The rotatable ring is made of steel and has a spur gear on its peripheral surface and it is journaled on the bearings to the stationary portion for rotation about a concentrically disposed work piece. A motor drives a spur gear that meshes with the spur gear on the rotatbale right and that rotates the rotatable ring about the concentric work piece. A cutting tool assembly is mounted on the rotatable ring for machining the work piece.

The prior art cutting tools, however, have not adequately addressed the need for machining the work piece at an angle, such as may be required in creating a beveled edge on an end of the work piece. Moreover, the cutting tools have been able to incrementally advance in a radial direction against the work piece, the prior art advancing mechanisms incrementally advance the cutting tool upon every revolution of the rotatable ring of the clamshell lathe by the interaction of a star wheel with a stationary ring. The present invention dispenses with the star wheel arrangement and instead uses a tripper mechanism that allows control over the extent of radial displacement of the cutting tool relative to the workpiece being machined.

SUMMARY OF THE INVENTION

The invention provides a swivel head module which includes an adjustable tool head assembly. The adjustable tool head assembly has a tool for machining the work piece, and is capable of being incrementally advanced in a radial direction against the work piece. Without limitation, the tool may be a steel bit, and abrasive surface, or other type of metal working tool known in the art. Moreover, the adjustable tool head assembly further includes a means for positioning the metal working tool along an x-axis, y-axis and z-axis. A tripper assembly is operatively coupled to the tool head assembly to incrementally urge the tool head against the work piece upon each revolution of the clamshell ring. The tripper assembly incorporates a solenoid that when remotely actuated, selectively controls incremental advancement of the tool against the work piece.

The primary advantage of the present invention is that it provides machining of the work piece at any desired angle between 0° and 90°.

An additional advantage of the present invention is that it provides an improved means for incrementally urging the cutting tool radially against the work piece from a locator remote from the swivel head module.

For a better understanding of the invention, and the advantages obtained in its use, reference should be made to the drawings and the accompanying descriptive material, in which there is illustrated an described a preferred embodiment of the invention representing the best mode known to us for practicing the invention.

DETAILED DESCRIPTION OF THE DRAWINGS

DETAILED DESCRIPTION OF THE INVENTION

Figure 1:
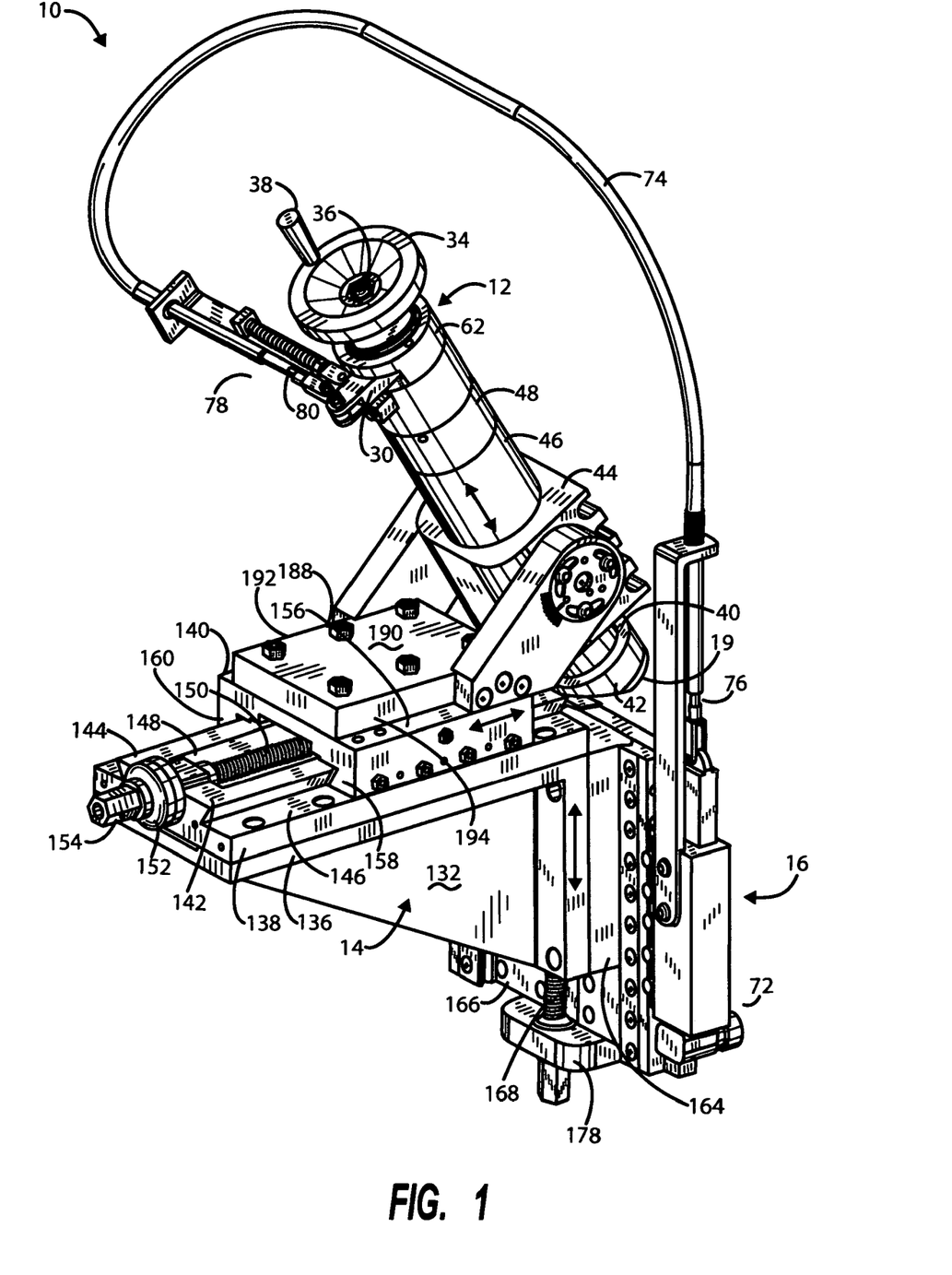
FIG. 1 is a perspective view of the swivel head module assembly of the present invention.
Figure 2A:
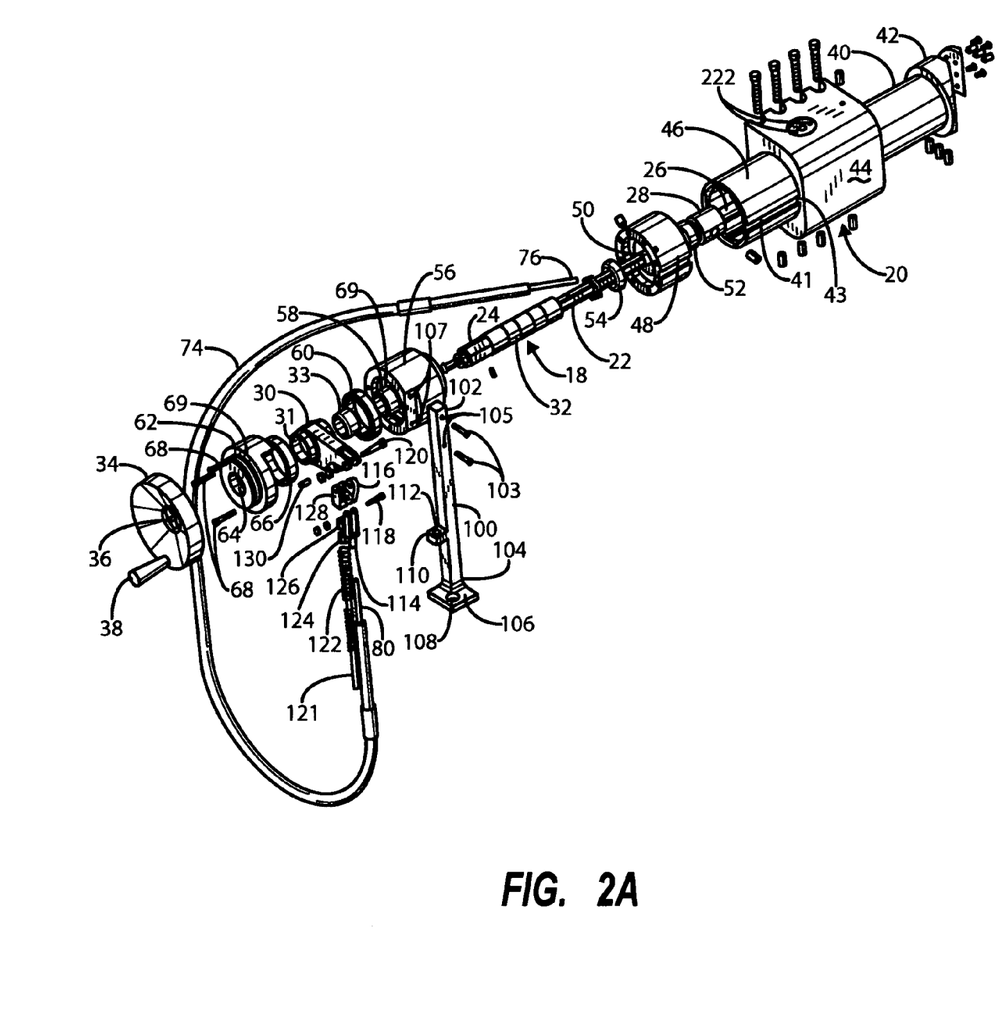
FIG. 2A illustrates an exploded view of the tool head displacement assembly of the swivel head assembly in accordance with the present invention.
Figure 2B:
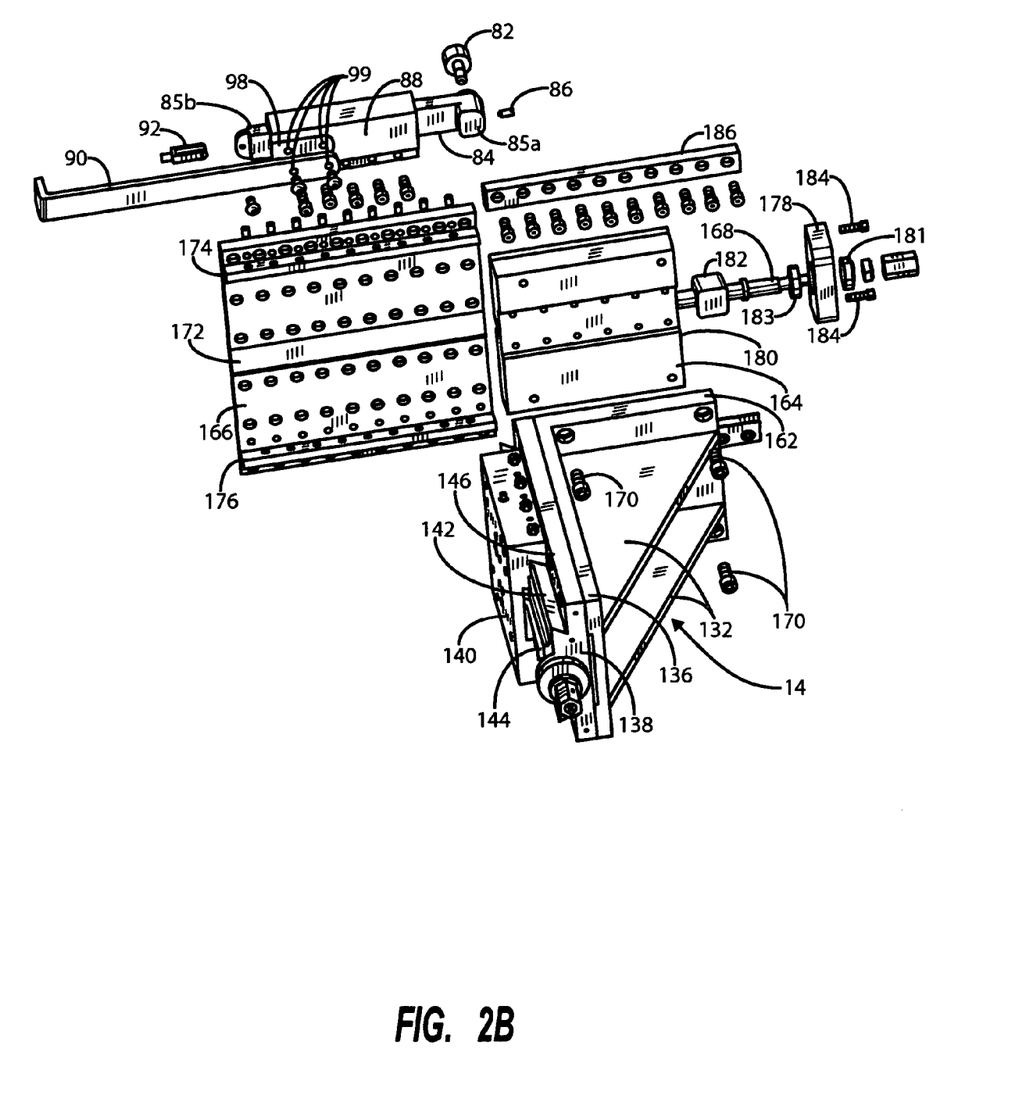
FIG. 2B illustrates an exploded view of the positioning assembly for positioning the tool head displacement assembly along the x-axis and y-axis of the swivel head assembly in accordance with the present invention.

FIG. 1 shows the adjustable swivel head assembly 10 having a suitable metal working tool (not shown) at a distal end thereof. The adjustable swivel head assembly 10 includes a tool head displacement assembly 12, a positioning assembly 14, and, a translation assembly 16. FIG. 2 shows an exploded view of the swivel head assembly 10

The tool head displacement assembly 12 includes a feed screw assembly 18 and a housing 20. The feed screw assembly 18 allows incremental displacement of the tool employed located at the distal end 19 of the assembly 12. The feed screw assembly 18 has a feed screw 22 (FIG. 2) with a first and a second end 24, 26 respectively. A feed nut 28 is translated along the feed screw 22 during rotation of the feed screw. Rotation of the feed screw 22 in a first direction translates the feed nut 28 toward the second end 26 of the feed screw 22, which in turn translates a bore bar that supports the metal working tool at its free end. Thus, when the feed nut 28 is incrementally translated, the metal working tool is incrementally urged radially against a work piece.

A cam arm 30 rotates the feed screw 22 through a one-way clutch in a manner fully described below to translate the feed nut 28. A plurality of one-way clutch sleeves 32 are disposed on the feed screw 22. The cam arm 30 has a feed screw aperture 31, supporting a roller clutch member 33. It engages the clutch sleeves 32 to rotate the feed screw 22 only in a first radial direction. The roller clutch 33 transmits torque between the cam arm 30 to the feed screw 22 and allows free overrun in the opposite direction. The cam arm 30 can be activated automatically by the translational assembly 16 in a way to be described, or manually by turning swivel head module hand wheel 34. The swivel head module hand wheel 34 is attached to the first end 24 of the feed screw 22. The swivel head module hand wheel 34 has a central feed screw hex aperture 36 which captures the first end 24 of the feed screw 22. A hand wheel handle 38 is coupled to the swivel head module hand wheel 34 to facilitate rotation of the hand wheel 34. Here, rotation of the swivel head module hand wheel 34 causes rotation of the radial feed screw 22 so that the feed nut 28 is urged against the bore bar 40 slidingly disposed in the housing 20 of the swivel head module 10. The feed nut 28 is disposed in the housing 20. Slidingly supporting a bore bar 40 having a free end 42. The metal working tool is adapted to be is disposed at the free end of the bore bar 40. The end of the bore bar 40 has a longitudinal groove 40 for receiving a key 43 formed on the swivel housing 44, allowing the bore bar 40 to slide without rotating in housing 44.

To ensure that the feed screw 22 stays axially, concentrically aligned in the housing 20, while at the same time facilitating rotation of the feed screw 22, a tube cap 48 is provided. The tube cap 48 has a central sleeve 50 for guiding the feed screw 22. A cup bearing 52 and cone bearing 54 cooperate to facilitate rotation of the feed screw 22. The cup bearing 52 is placed on a opposing side of the sleeve 50 from the cone bearing 54.

To accommodate rotation of the cam arm 30 in the housing 20, a lower cam bracket 56 and an upper cam bracket 62 when bolted together by fasteners 68 to form a housing for a set of ball bearings 60 and 66 journaling the screw 22. The cam arm 30 is also contained within the housing formed by the lower cam bracket 56 and an upper cam bracket 62.

The cam arm 30 is activated by the translational assembly 16. The translational assembly 16 communicates with a tripper assembly 70 (shown in FIGS. 3 and 4) to remotely activate the displacement assembly 12 of the swivel head module 10. The translation assembly 16 includes a roller bracket assembly 72 coupled to a cam cable 74 at a first end 76 of the cam cable 74, and to cam arm bracket assembly 78 at a second end 80 of the cam cable 74.

The roller bracket assembly 72 includes a roller 82 coupled to a roller cable bracket 84. The roller cable bracket has a first and second end 85a and 85b. The roller 82 is threaded into the roller cable bracket 84. Adjustment screw 86 positions the roller 82 so it contacts ramp 232 in a desired position. The roller cable bracket 84 is slidingly disposed in a roller bracket housing 88. When the roller 82 intersects with a ramp of the tripper assembly 16, the roller bracket 84 slides upward in the roller bracket housing 88. A cable guide 90 is coupled to the roller bracket housing 88. The first end 76 of the cam cable 74 is coupled to a first clevis 92. The first clevis 92 is coupled to the second end 85b of the roller cable bracket 84.

The cam arm bracket assembly 78 includes a cable bracket 100 having a first and second end 102, 104. The cam cable bracket 100 has a cable plate 106 at its second end 104. The cable plate 106 has a cable plate aperture 108 which the cam cable 74 passes through. The cam cable bracket 100 further includes a guide weldment 110 with a guide aperture 112 through it. The first end 102 of the cable bracket 100 is coupled to the lower cam bracket 56 by fasteners 103 pass through apertures 105 and into threaded apertures 107 in bracket 56.

The cam arm bracket assembly 78 further includes a second clevis 114 coupled to the second end 80 of the cam cable 74. The second clevis 114 is coupled to a cam link 116 by a shoulder bolt 118. The cam link 116 is joined to the cam arm 30 by a further shoulder bolt 120.

A cam spring rod 121 extends from ear 110 to the clevis 114 that connects to the cam arm 30. The cam rod 121 also includes a cam rod spring 122 which extends from ear 110 to the base portion of clevis 114, and encircles the cam rod 121. First and second hex nuts 124, 126 connects the cam rod 121 to a clevis 128. The clevis 128 is secured to the cam arm 30 by a dowel 130 which passes through aligned apertures in the clevis 128 and the cam arm 30.

When the roller 82 runs up a ramp 232 or 234 of the tripper assembly 16, the roller cable bracket 84 is urged upward. The force is transferred through the cam cable 74 to the cam arm 30. The cam arm 30 is thereby rotated by an amount determined by the ramp slope, and the torque is transferred to the feed screw 22 via the roller clutch 33. This in turn urges the facing tool against the work piece.

Positioning assembly 14 comprises a pair of triangular steel gussets 132 that support the leg portions of a right angle base plate member 136. The positioning assembly 14 can position the tool head displacement assembly 12 against the work piece along an x-axis, y-axis and z-axis as indicated by the double headed arrow markings on FIG. 1. The x-axis platform 134 includes the base plate 136, a fixed x-axis slide plate 138 and a movable x-axis saddle 140. The x-axis slide plate 138 has a pair of opposing gibs 142, 144 affixed to the surface 146 of the x-axis slide plate 138. As observed in FIG. 1 the first and second opposing gibs 142, 144 together form a channel 148 in which an x-axis feed screw 150 is located. X-axis feed screw 150 is journaled in a bearing allowing it to rotate in the channel 148. A feed nut is threaded on the screw 150 and engages the x-axis saddle 140. The x-axis saddle 140 has a top surface 156 and a bottom surface (unnumbered) with a first and second saddle legs 158, 160. The saddle legs 158, 160 mate to the first and second opposing gibs 142, 144 such that when the feed screw 150 is rotated the feed nut translates the saddle 140 along the first and second opposing gibs 142, 144.

The y-axis platform 162 is also supported buy the gussets 132 perpendicular to the x-axis platform 136. The y-axis platform 162 includes a y-axis saddle 164, a y-axis side plate 166 and a y-axis feed screw 168. The movable y-axis saddle 164 is bolted to a leg of the member 136 by a plurality of fasteners 170. Y-axis slide plate 166 has a central channel 172 defined by a pair of parallel gibs 186 and 187. A y-axis feed screw bracket 178 is attached to an end wall 180 of the y-axis slide plate 166 and supports bearings 181 and 183 used to journal the feed screw 168. The roller bracket assembly 72 is fastened to the y-feed saddle slide plate 166. Thus, when the y-axis feed screw is rotated, the base plate 136 supporting the assembly 12 is raised or lowered along the y-axis.

The z-axis platform comprises a steel plate 188 bolted atop the x-axis saddle 140. The z-axis platform 188 has a top surface 190 and a first and second sides 192, 194. A left swivel bracket 200 is bolted to the first side surface 192, and a right swivel bracket 202 is coupled to the second side surface 194 using socket head cap screws at as 196. The left and right swivel brackets 200, 202 both have swivel lock apertures 204 for containing a swivel housing lock 206, 208. The left and right swivel bracket 200, 202 are pivotally coupled to the swivel housing 44.

Figure 2C:
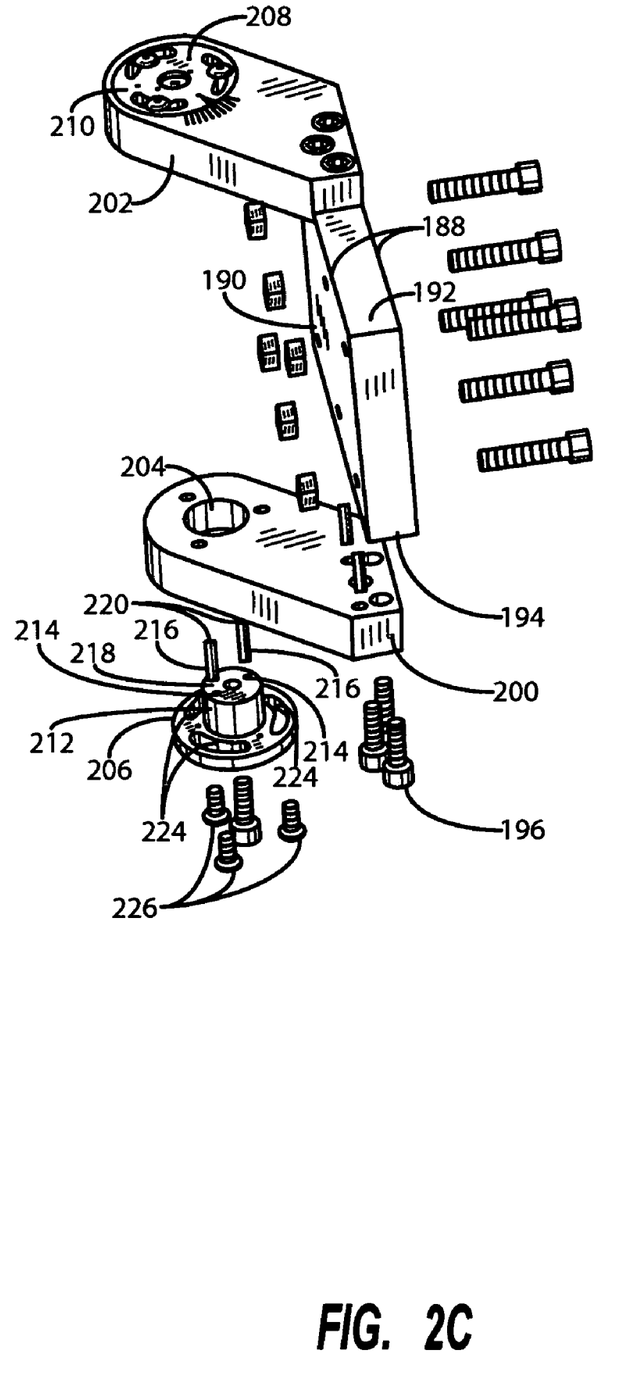
FIG. 2C shows an exploded view of the positioning assembly for positioning the tool head displacement assembly along the z-axis.

As seen in FIG. 2C, the swivel housing locks 206, 208 comprise an annular flange 210 surrounding a central circular hub 212. Hub 212 has a pair of apertures 214 in which a pair of dowels 216 are adapted to be inserted. The swivel lock dowels 216 project into aperture 214 mating swivel housing dowel aperture 222 formed in the swivel housing 44. Thus, the swivel housing 44 along with the entire housing assembly 12 is also rotated. It is to be noted that the annular flange 210 of the swivel housing locks 206, 208 have a plurality of arcuate apertures 224. Socket head cap screws 226 are inserted into each arcuate aperture 224. The intersection of the end of the arcuate apertures 224 with the screws 226 acts as a limiter on the rotation of the swivel lock 206. Additionally, the screws 226 secure the swivel lock 206 into a desired set position so that the assembly 12 will be at a predetermined angle to the work piece.

Figure 3:
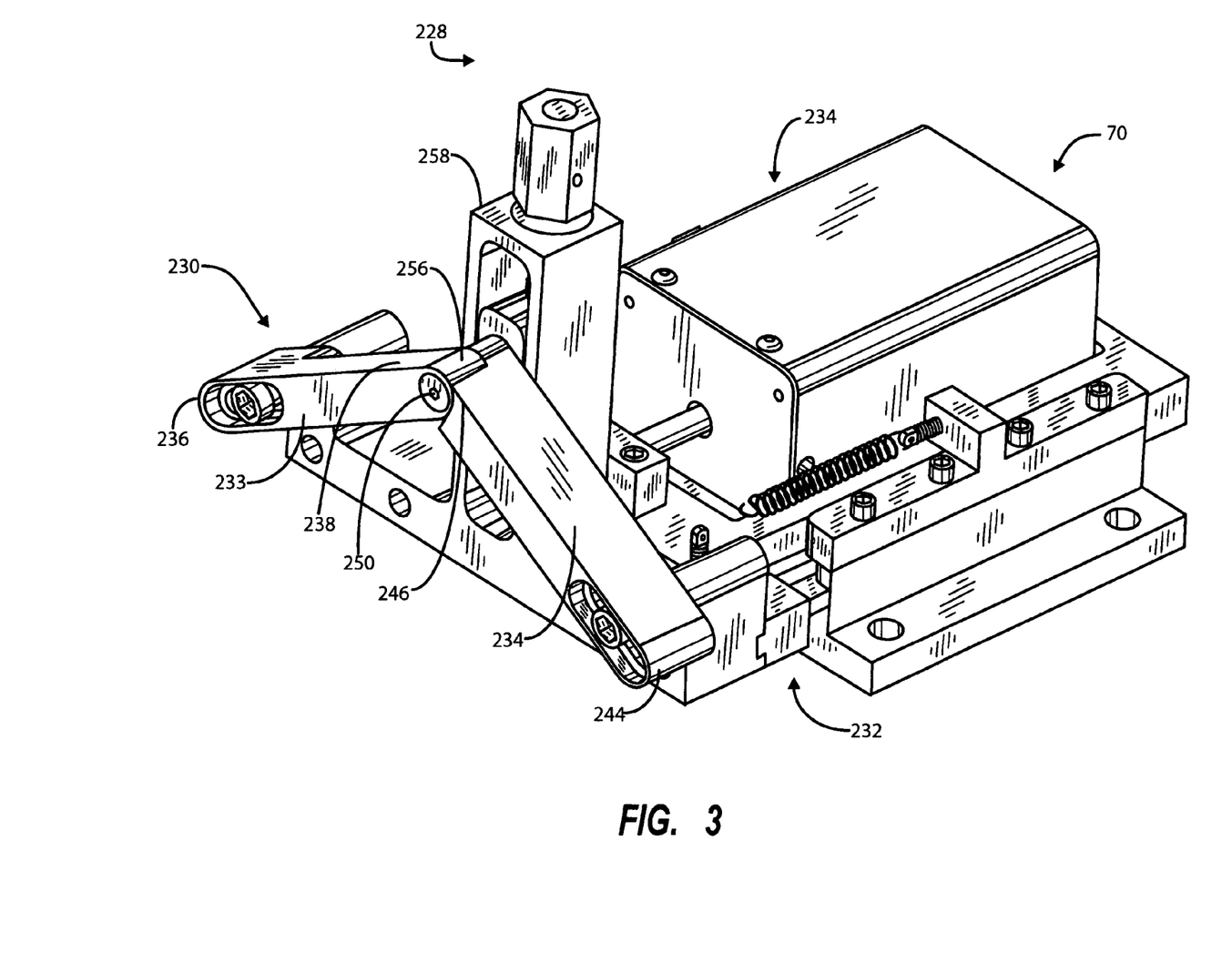
FIG. 3 shows a perspective view of the tripper assembly used with the swivel head assembly of the present invention; and, FIG. 4 is an exploded view of the tripper assembly of FIG. 3.
Figure 4:
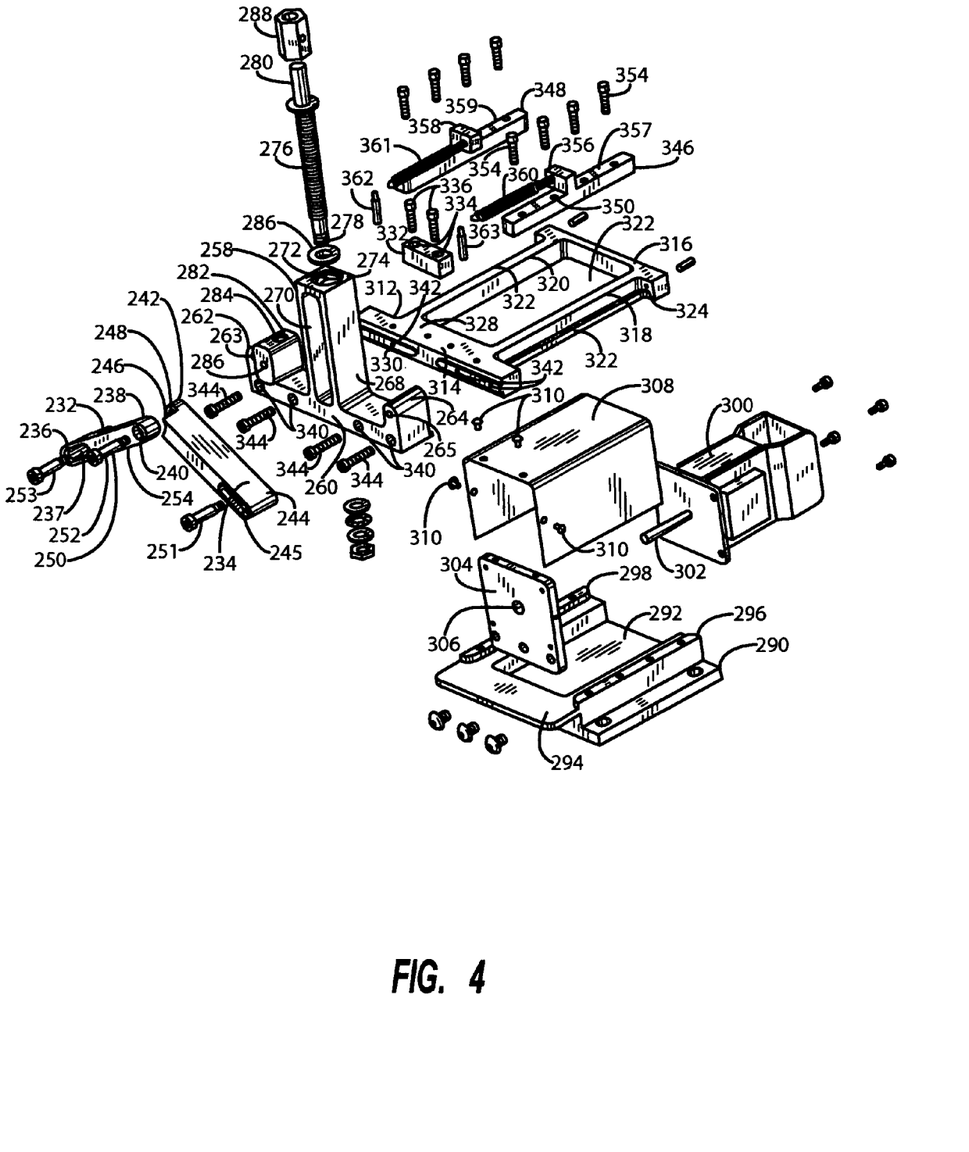

The tripper assembly 70, shown in FIGS. 3 and 4, includes a ramp assembly 230 and a slide assembly 232, and a solenoid assembly 234. The ramp assembly 230 cooperates with the roller 82 to activate the translation assembly 16. The ramp assembly 230 includes a feed ramp 233 coupled to a reverse ramp 234. The feed ramp 233 has a first end 236 and a second end 238. The second end 238 of the feed ramp 233 has a feed ramp pivot aperture 240 (FIG. 4). The reverse ramp 234 has a first end 242 and a second end 244. A pivot notch 246 is located at the first end 242 of the reverse ramp 234. The pivot notch 246 is adapted to receive a second end 238 of the feed ramp 233. A reverse ramp pivot aperture 248 is located adjacent the pivot notch 246. When the second end 238 of the feed ramp 233 is inserted into the pivot notch 246, the feed ramp pivot aperture 240 is aligned with the reverse ramp pivot aperture 248. A pivot shoulder screw 250 is inserted into the now aligned feed ramp pivot aperture 240 and reverse ramp pivot aperture 248 to form up and down ramp segments 256.

The ramp assembly 230 further includes a feed adjustment bracket 258. The feed adjustment bracket 258 includes a base portion 260 having a first and second end 262, 264. An integrally formed stem portion 268 extends perpendicularly from a midpoint of the base portion 260. The stem 268 has a central oval-shaped aperture 270 and a top feed screw aperture 272 through the top surface 274 and intersecting the oval aperture. A feed adjustment feed screw 276, having a first and second end 278, 280 is inserted through the top of the feed screw aperture 272. A feed adjustment feed nut 282 is threaded onto the feed adjustment feed screw 276. When the feed adjustment feed screw 276 is journaled for rotation in the central aperture 272, the feed adjustment feed nut 282 is translated along the feed adjustment feed screw 276 in the central aperture 270 as the screw is rotated. The feed adjustment feed nut 282 has a feed screw aperture 284 and a pivot connection aperture 286 at right angles to one another. The second end 254 of the pivot shoulder screw 250 is threaded into the pivot connection aperture 286 of the feed adjustment feed nut 282. Thus, as the feed adjustment feed nut 282 is translated, the angle of the pitch of the ramp 256 is adjusted. The feed adjustment feed screw further includes a bushing 286 located proximate the top opening 272. A hex nut 288 is coupled to the second end 280 of the feed adjustment feed screw 276. Feed ramp 233 further includes a feed ramp oval aperture 237 at first end 236. Reverse ramp 234 includes a reverse ramp oval aperture 245 at second end 244. A feed ramp shoulder screw 253 passes through the feed ramp oval aperture 237 and is fastened to the first end 262 of the horizontal segment 260 by feed ramp fastener aperture 263. The reverse ramp 234 is secured to the feed adjustment bracket as well. A ramp feed aperture 251 passes through the oval-shaped reverse feed aperture 245 and is inserted into reverse feed fastener aperture 265. Reverse feed fastener aperture 265 is disposed on the second end 264 of the horizontal segment 260.

An electrically operated solenoid assembly 234 has a tripper base 290. The tripper base 290 has a main plate 292 coupled to a u-shaped flange 294. The u-shaped flange 294 has a first and second flange gibs 296, 298. A solenoid 300 having a reciprocally moveable plunger 302 is disposed on the main plate 292 with the u-shaped flange 294 surrounding the periphery of the solenoid 300. A front solenoid mount bracket 304 is provided with a central opening 306 to accommodate the projection 302. A solenoid cover 308 covers the solenoid 300. A plurality of fasteners 310 secure the solenoid cover 308 to the solenoid mount bracket 304.

The slide assembly 232 includes a slide plate 312 having a front assembly 314, a back assembly 316 and a first and second side wall 318, 320. The side walls 318, 320 combine with the front and back assemblies 314, 316 to form a solenoid receiving aperture 322. The slide plate 312 closely overlays the tripper base 290. The first and second flange gibs 296, 298 are disposed next to the outside surfaces 322 of the first and second side walls 318, 320. Moreover, the first and second end 324, 326 of the back segment 316 acts as a limiter on the slide plates 312 ability to slide forward.

The front segment 314 has a top surface 328 and a front surface 330. A push bracket 332 is coupled to the top surface 328 of the front segment 314. The push bracket 332 is bolted to the front of the tripper slide 312 as shown.

The front surface 330 of the slide plate 312 is attached to the feed adjustment bracket 260 again by screw fasteners 344. The solenoid 300 urges the solenoid plunger 302 against the push bracket 322 thus sliding the slide plate 312 and the feed adjustment bracket 260 into the path of the roller 82 as the assembly 10 orbits the workpiece held in the clamshell. The roller rolls up feed bracket 233, causing the translation assembly 16 to activate the cam arm 30, as previously described. Because of the one-way clutch arrangement, the roller descending the ramp 234 does not result in further rotation of the screw 22.

First and second tripper gibs 346, 348 are bolted to the top of the solenoid gibs 296, 298 respectively as shown in FIG. 4.

The gibs 346 and 348 each have a boss 356, 358 projecting from an upper surface 357. Spring anchor pegs 363 and 362 are inserted into holes formed in the top surface 328 of the front segment 314 across from the bosses 356 and 358. Biasing springs 360 and 361 extend between the two bosses and the two spring anchor pegs 362 and 363. When the solenoid plunger 302 retracts on de-energization of the solenoid, the first and second biasing springs 360, 361 urge the slide assembly 312 to return to its home position out of the path of the roller 82 terminating movement of the tool bit relative to the workpiece.

This invention has been defined herein in considerable detail in order to comply with the patent statutes and to provide those skilled in the art with the information needed to apply the novel principles and to construct and use such specialized components as are required. However, it is understood that the invention can be carried out by specifically different equipment and devices, and that various modifications, both as to the equipment details and operating procedures, can be accomplished without departing from the scope of the invention itself.

What is claimed is:

1. A metal working tool support for use with a clamshell lathe, the clamshell lathe including a fixed annular member and a rotatable annular member journaled to the fixed annular member, comprising:
    (a) a slide plate adapted to be attached to the rotatable annular member of the clamshell lathe;
    (b) a bracket having first and second perpendicular legs, the first leg being slidably mounted on the slide plate;
    (c) a saddle member slidably mounted with respect to the second perpendicular leg; and
    (d) a tool head displacement assembly having a first lead screw journaled for rotation in a housing and operatively coupled to a tool supporting head for translating the tool supporting head along a predetermined axis, said housing being pivotally attached to the saddle member for pivoting about an axis perpendicular to said predetermined axis.

2. The metal working tool support of claim 1 and further including:
    (a) a second lead screw rotatably mounted to the slide plate; and (b) a traveling nut disposed on the second lead screw and operatively coupled to the first leg of said bracket wherein rotation of the second lead screw translates the first leg along the slide plate.

3. The metal working tool support of claim 1 and further including:
    (a) a further lead screw rotatably mounted with respect to the second leg of the bracket; and
    (b) a traveling nut disposed on the further lead screw and operatively coupled to the saddle member wherein rotation of the further lead screw translates the saddle member along the second perpendicular leg.

4. The metal working tool support of claim 1 and further including a locking fixture cooperating with the housing, the locking fixture maintaining a selected angle between said predetermined axis and a direction of travel of the saddle member.

5. The metal working tool support of claim 1 and further including:
    (a) a cam arm member extending radially outward from said housing, the cam arm member being coupled through a clutch mechanism to the first lead screw for imparting rotation to the first lead screw when the cam arm member is rotated in a first direction.

6. The metal working tool support as in claim 5 and further including:
    (a) a roller affixed to one end of a reciprocably movable plunger assembly supported on the slide plate; and
    (b) a coupling mechanism connecting the plunger to the cam arm member wherein the coupling mechanism rotates the cam arm member a distance related to movement of the plunger assembly.

7. The metal working tool support of claim 6 and further including:
    (a) a tripper assembly having an ascending ramp and a descending ramp, the tripper assembly being affixed to the fixed annular member of the clamshell lathe; and
    (b) means for selectively positioning the ascending ramp and the descending ramp in and out of a path of travel of the roller.

8. The metal working tool support of claim 7 wherein the means for selectively positioning comprises an electrical solenoid.

9. The metal working tool support of claim 7 and further including a manually operable adjustment mechanism adjusting the slope of said ascending and descending ramps.

10. The metal working tool support of claim 3 and further including a cam arm member extending radially outward from said housing, the cam arm member being coupled through a one-way clutch mechanism to the first lead screw for imparting rotation to the first lead screw when the cam arm member is rotated in a first direction, but not in a second direction opposite to the first direction.

11. The metal working tool support as in claim 10 and further including:
    (a) a roller affixed to one end of a reciprocably movable plunger assembly supported on the slide plate; and
    (b) a coupling mechanism connecting the plunger to the cam arm member wherein the coupling mechanism rotates the cam arm member a distance related to movement of the plunger assembly.

12. The metal working tool support of claim 11 and further including:
    (a) a tripper assembly having an ascending ramp and a descending ramp, the tripper assembly being affixed to the fixed annular member of the clamshell lathe; and
    (b) means for selectively positioning the ascending ramp and the descending ram in and out of a path of travel of the roller.

13. The metal working tool support of claim 12 wherein the means for selectively positioning comprises an electrical solenoid.

14. The metal working tool support of claim 11 and further including a manually operable adjustment mechanism for adjusting the slope of said ascending and descending ramps.

* * * * *